Feb. 12, 1924.  
M. R. HULL  
TOP FOR MOTOR VEHICLES  
Filed June 9, 1922  
1,483,810  
4 Sheets-Sheet 2
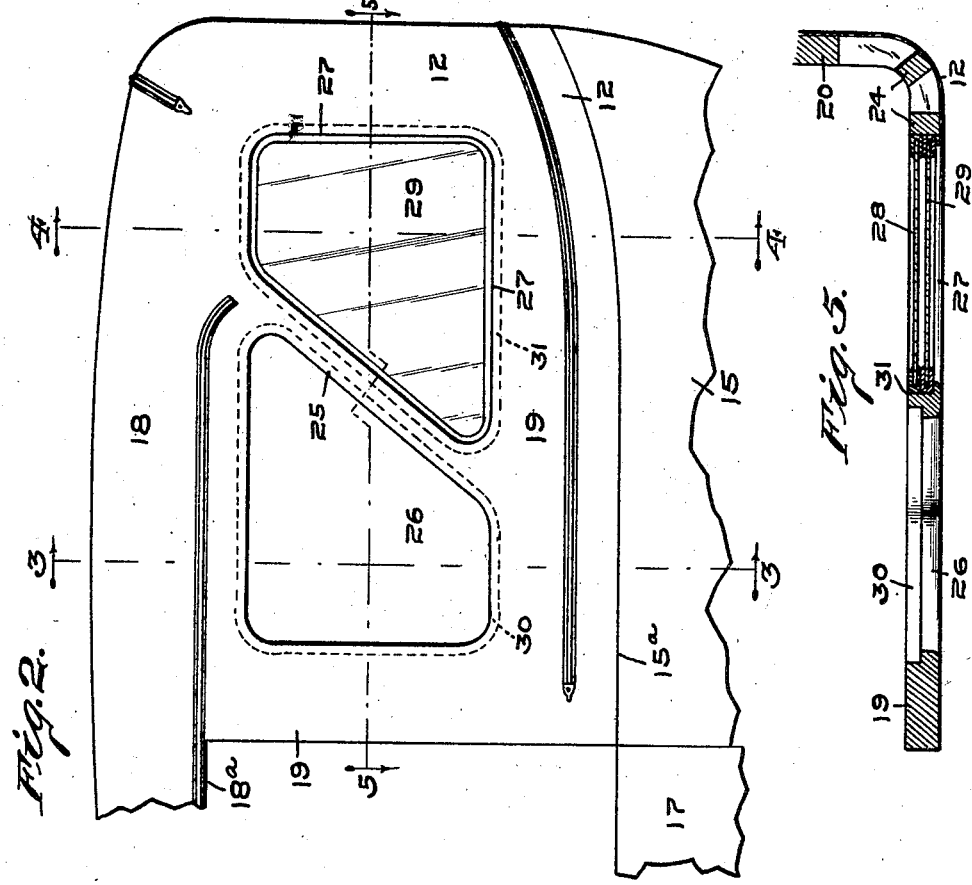
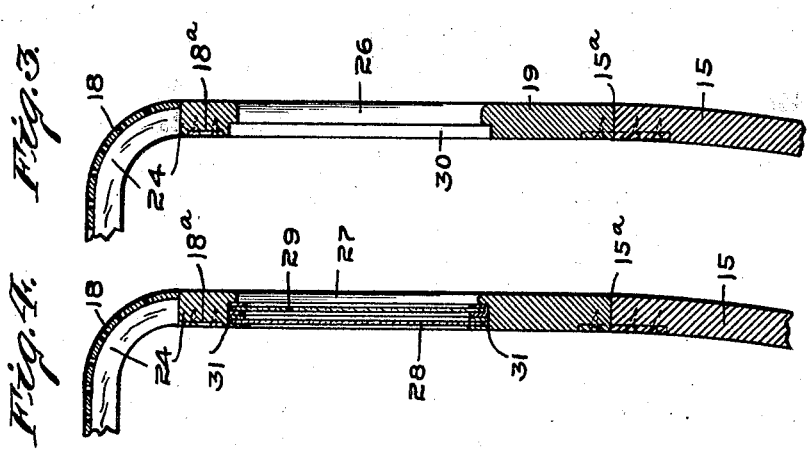
INVENTOR:  
Matthew R. Hull,  
By Frank W. Worner  
ATTORNEY.

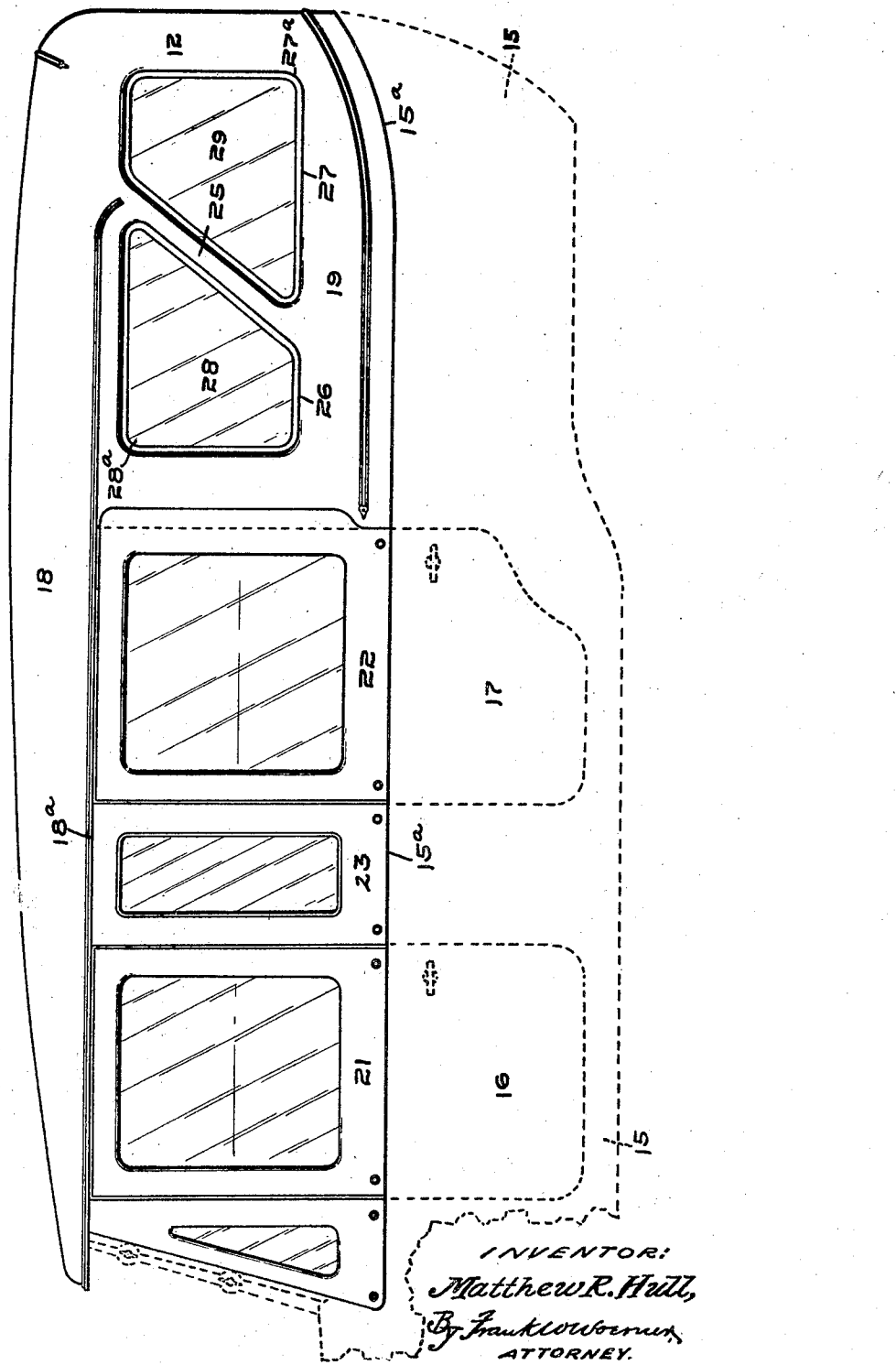

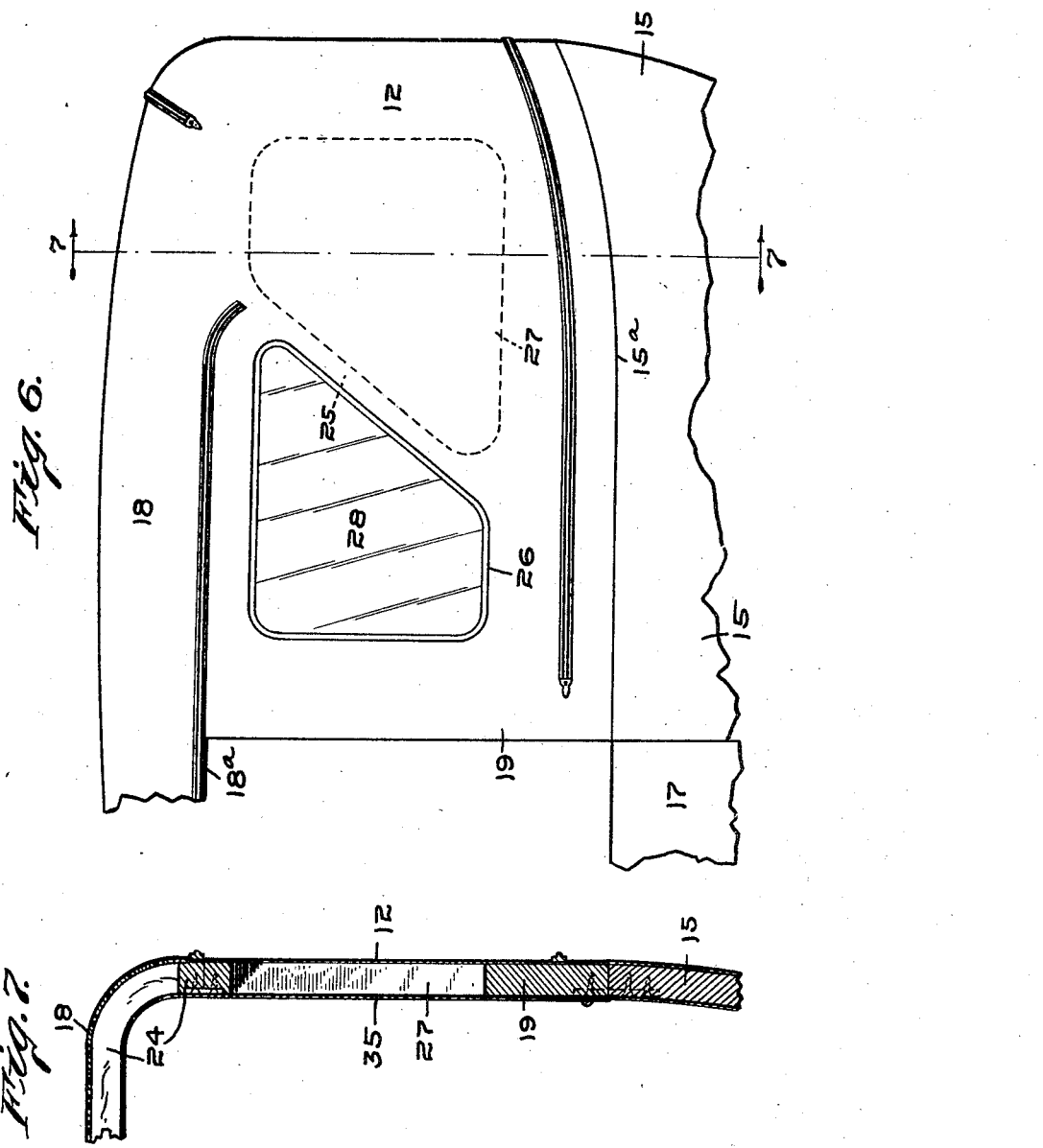

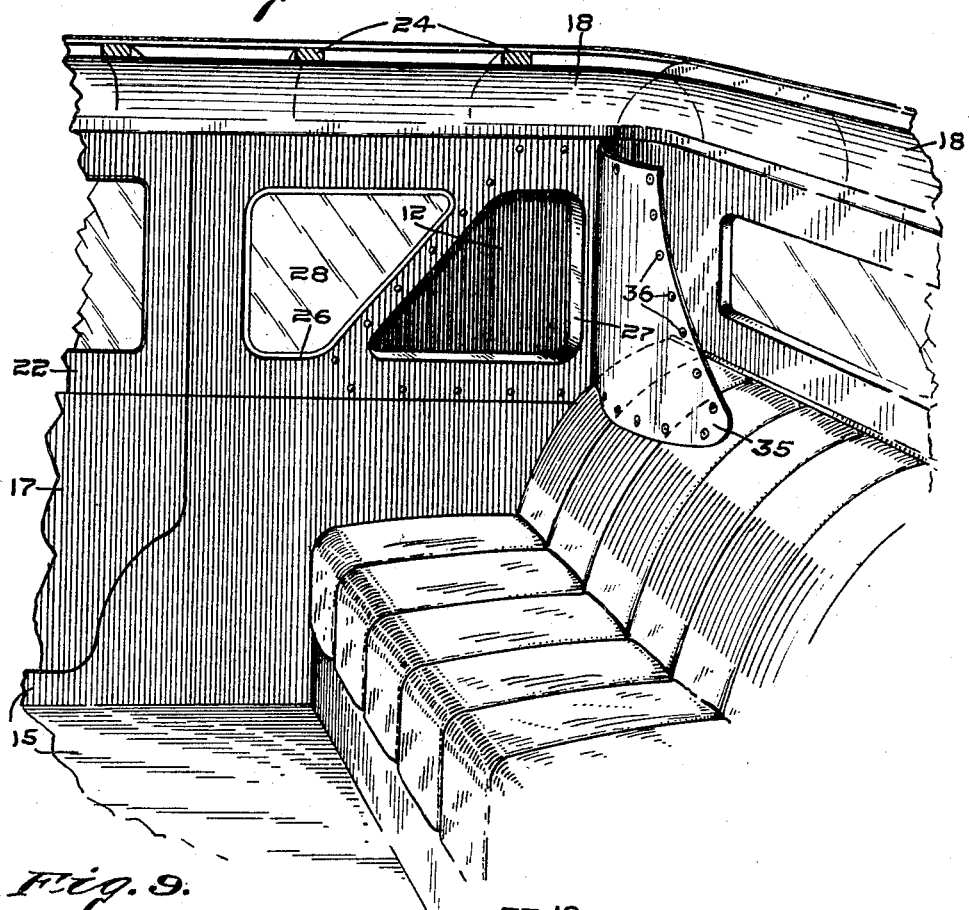
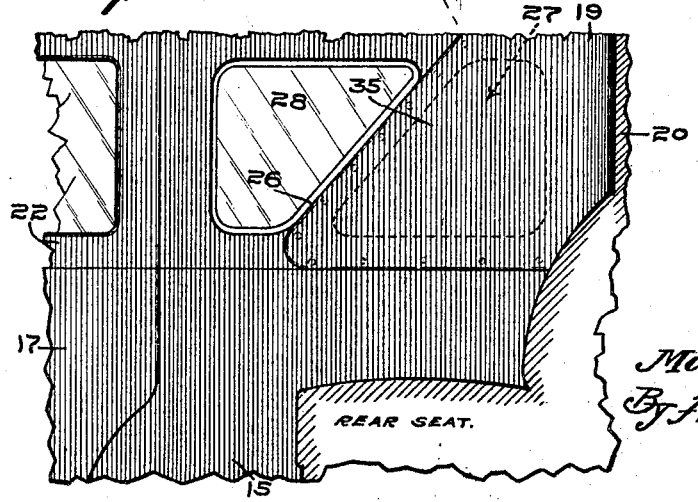

Patented Feb. 12, 1924.

1,483,810

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION.

TOP FOR MOTOR VEHICLES.

Application filed June 9, 1922. Serial No. 566,971.

*To all whom it may concern:*

Be it known that I, MATTHEW R. HULL, a citizen of the United States, residing at Connersville, in the county of Fayette and State of Indiana, have invented certain new and useful Improvements in Tops for Motor Vehicles, of which the following is a specification.

This invention relates to certain improvements in that class of automobile tops which is known in the art as the "California type", this style of top being intended to replace the conventional cape or folding top ordinarily furnished with all makes of open touring cars for the reason that it practically affords the advantages and protection to the occupants against rain, wind and snow, and at a considerably less expense than the solid built sedan and limousine constructions. The California type top includes a construction wherein the sides may be removed as far back as the rear edges of the rear doors for summer driving, but back of these points the top encloses a considerable portion of the body around the rear seat, so that persons occupying the rear seat do not secure all possible ventilation, and moreover they are obliged to bend forward considerably when they desire to converse with anyone standing outside when the car is at rest.

One of the objects of the present invention consists in the provision of means to greatly increase the ventilation efficiency of the interior of this type of top by securing a better and more thorough distribution of the air, so that the occupants in the rear seat will derive a greater degree of comfort, especially during the hot weather, than obtains in the present type of this class of top construction.

A further object of the invention consists, primarily, in constructing the top with openings which are uniformly divided into two equal areas so that the window frame may be removed from one opening and be placed back of the window in the other opening, or into a pocket if desired, without detracting the general appearance of the top.

Other noteworthy features and characteristics of the improvements hereinafter claimed will be made apparent to those skilled in this art by the following detail description of various exemplary embodiments of my invention as applied to various types and forms of automobile top constructions.

Figure 1 is a side elevation of my new improved type of California top. Fig. 2 is a fragmentary detail view of the rear portion of the construction shown in Fig. 1, in which one of the window panels is removed. Fig. 3 is a vertical cross section through one side of the top, on the plane 3—3 in Fig. 2. Fig. 4 is a vertical cross section, on the plane 4—4 in Fig. 2. Fig. 5 is a horizontal section, on the plane 5—5 in Fig. 2. Fig. 6 is a view similar to Fig. 2 except that one of the window openings is permanently closed to form a pocket for the removable window panel. Fig. 7 is a vertical cross section, on the plane 7—7 in Fig. 6. Fig. 8 is a fragmentary detail perspective view of the interior of the top shown in Fig. 6, in which the pocket is uncovered. Fig. 9 is a fragmentary detail elevation of the interior wall of the top, showing the pocket covered.

Referring to the drawings, 15 represents a conventional type of open touring body for motor vehicles; 16 and 17 the doors; 18 the deck, which is provided with a depending section 19 forming a permanent closure between the lower edge $18^a$ of deck 18 and the upper rim $15^a$ of the body 15, and extending around the rear portion of the body between the rear edges of the doors 17 to include the rear wall 20. 21, 22 and 23 are the upper door extensions and intermediate panels all of which may be removed for summer driving. The top includes a wooden skeleton framework 24 which is preferably covered on its outer surface with a thin metal sheathing 12 which adds rigidity to structure, and provides a smooth surface for enameling or other finishing surface.

It has heretofore been the practice in constructing California type tops to provide each side wall of depending section 19 with a rectangular opening into which a permanently fixed window was placed for lighting and observation purposes. This type of construction so enclosed the back portion of the top that persons occupying the rear seat were more uncomfortably oppressed by the heat, especially in hot weather, than the persons occupying the forward seat where better ventilation is secured by reason of the sides of the top being removed. Moreover, the side walls of the depending section 19 extend forwardly a considerable distance from the rear seat so that the occupants, desiring to converse with a person on the outside of the car, were obliged to rise from their seat and move forward beyond the vertical edges of the section 19. This feature was objectionable and annoying, evoking criticism, and prevented sales to those persons having had such experiences.

The present top is adapted to overcome the above mentioned objections and to meet demands that the previous top failed to satisfy. To this end each side wall of depending section 19 is provided, preferably, with a rectangular opening which is divided by a fixed parting-rail 25 so as to form two openings 26 and 27 of equal area. These openings are closed by glass window panels 28 and 29 which may both be made removable from their respective openings, or one may be permanently and the other removably mounted, as indicated in Figs. 1 to 5 inclusive. In the present case I have mounted window panel 29 adjacent to the rear seat in a permanent manner, and have made window panel 28 removable, said window being shown removed in Fig. 2. The frame work 24 around openings 26 and 27 is gained or grooved to form seats 30 and 31 for the window panels 28 and 29, and as shown in Figs. 3 and 5 opening 26 is surrounded with the grooved-seat 30 having a depth to correspond with the thickness of the single panel 28, the grooved-seat 31 around opening 27 being of sufficient depth to receive, in addition to the permanently fixed panel 29, the panel 28 which was removed from the opening 26, so that the seat 31 provides a repository into which the panel 28 may be placed, where it will be out of the way and where it may be further utilized for observation purposes without interfering with the passage of light. When panel 28 is removed opening 26 affords greater ventilation besides permitting the occupants of the rear seat to freely converse with a person standing outside of the car. This is a decided advantage over the prior constructions of this type of top. When panel 28 is to be inserted into the seat 31 it is turned over so as to bring the corner 28$^a$ into registration with corner 27$^a$ of opening 27.

The heretofore described structure illustrated in Figs. 1 to 5 inclusive may be modified slightly to meet certain demands of the trade which may require only one permanent opening in each side of depending section 19, as illustrated in Figs. 6 to 9 inclusive. In the latter case, the skeleton framework of the top is constructed substantially the same as the one previously described; that is to say, each side wall of depending section 19 is initially provided with one large opening which is divided into two smaller openings of equal areas, but instead of cutting two openings into the metal sheathing 12, only one is cut to register with opening 26, the metal being extended over to close the outside of opening 27, so that a pocket is formed in the wall of section 19 and into which pocket the removable window panel 28 may be stored. The inner opening leading into pocket is closed by a suitable flap 35 which is covered with the same material so as to harmonize with the interior upholstery of the top and vehicle body. Flap 35 is conveniently held in place by suitable glove fasteners 36, or similar fastening devices.

With the foregoing construction in mind it will be observed that the present top provides all of the benefits and advantages derived from the prior tops on market with the additional advantage of increasing the circulation of the air; the storage of the removable window panels so as not to interfere with the passage of light, and to preserve the desired neat and external appearance of the top.

Having thus fully described my said invention, what I desire to secure by Letters Patent, is—

1. An automobile top including a deck having a depending section and the section having in each side a major opening divided to form a pair of minor openings of equal areas, so as to admit a window removed from one minor opening to be inserted back of the window in the remaining opening.

2. An automobile top including a deck having a depending section provided in each side wall with a major opening permanently divided into two minor openings of equal areas to admit a window removed from one minor opening to be inserted into the remaining opening, and the depending section having ribs formed around the marginal edges of the openings to form stops to limit the introduction of the windows into the minor openings.

3. An automobile top including a deck having a depending section provided with a major opening in each side wall, each of said major openings being divided to form a pair of minor openings of equal areas to admit a window removed from one opening to be inserted into the remaining opening, the depending section being further reinforced by an external sheathing which extends over and covers one of the minor openings in each side wall and the sheathing having openings to register with the remaining minor opening in each side wall of the depending section, and the depending section having flaps for closing the inlets to the openings closed on their outer sides by the external sheathing.

4. In an automobile top, a deck, a fixed section depending from the deck and having a rectangular major opening in each side wall, means for dividing each major opening into a pair of trapezoidal minor openings of equal areas, windows removably mounted in the minor openings, and means in one minor opening for holding a window taken from the adjacent opening, substantially as set forth.

5. In an automobile top, a deck, a section depending from the deck and having a major opening in each side wall, means for dividing each major opening into two minor openings of equal areas, a sheathing covering the external surface of the depending section and having openings to correspond to and register with one of the minor openings in each side wall of the depending section, and flaps for closing the inner sides of the minor openings having their outer sides covered by the sheathing.

In witness whereof I have hereunto set my hand and seal at Connersville, Indiana, this 22nd day of May, A. D., one thousand nine hundred and twenty-two.

MATTHEW R. HULL. [L. S.]